Figure 1:
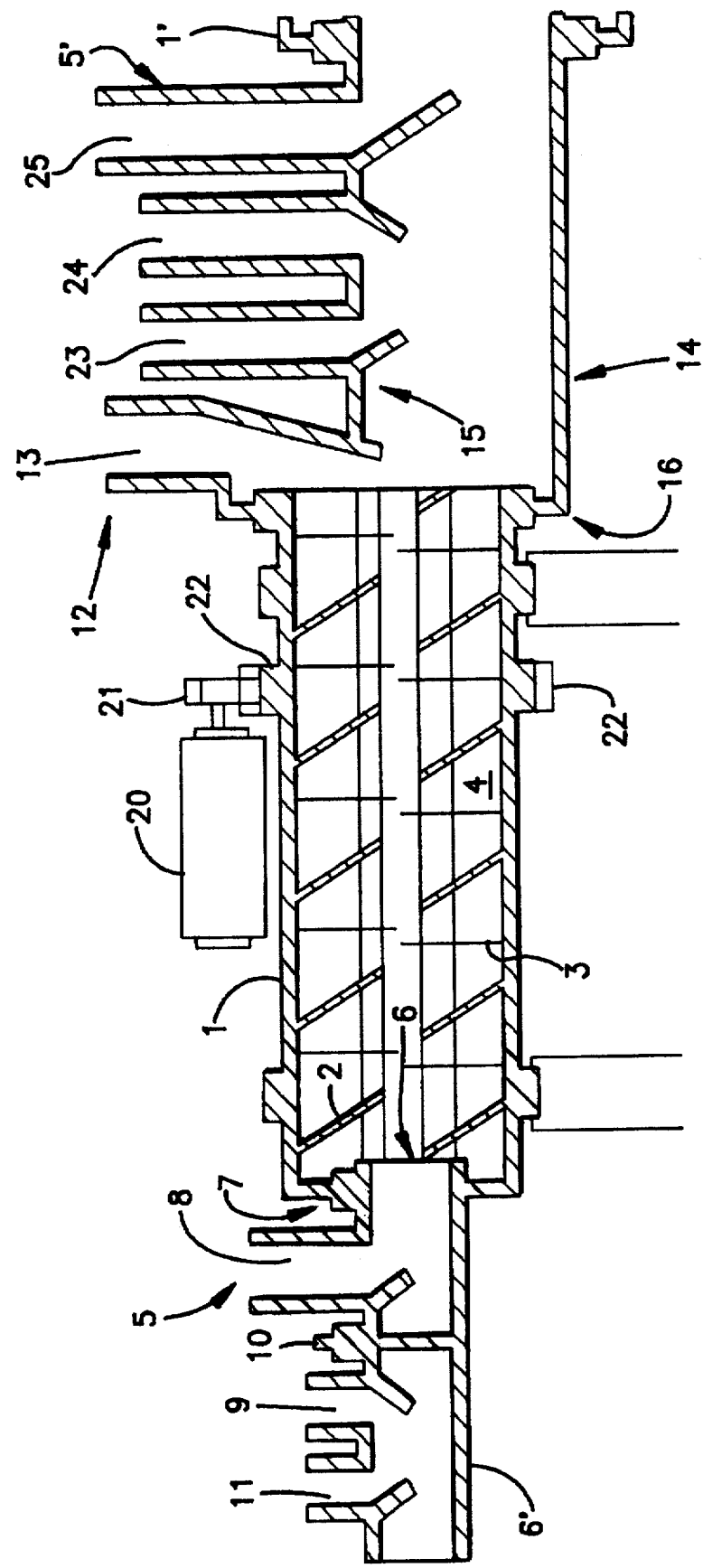

United States Patent [19]
Celi

[11] Patent Number: 5,700,425
[45] Date of Patent: Dec. 23, 1997

[54] DEVICE FOR THE PRETREATMENT OF ELECTRONIC SCRAP

[76] Inventor: Antonio Maria Celi, Anagni Località Paduni-Casarene Frosinone, Italy

[21] Appl. No.: 332,142

[22] Filed: Oct. 31, 1994

[30] Foreign Application Priority Data

Nov. 3, 1993 [IT] Italy .................. RM93A0724

[51] Int. Cl.$^6$ ................................... C22B 1/00
[52] U.S. Cl. ........................... 266/145; 266/205
[58] Field of Search ..................... 266/901, 205, 266/184, 229, 248, 145; 75/401

[56] References Cited

U.S. PATENT DOCUMENTS

| | | | |
|---|---|---|---|
| 3,550,925 | 12/1970 | Evans | 75/401 |
| 3,799,735 | 3/1974 | Jensen | |
| 4,639,216 | 1/1987 | Schnupp | |
| 5,196,154 | 3/1993 | Celi | 266/205 |
| 5,198,018 | 3/1993 | Agarwal | 75/401 |
| 5,520,814 | 5/1996 | Celi | 210/638 |
| 5,522,153 | 6/1996 | Celi | 34/178 |

FOREIGN PATENT DOCUMENTS

| | | |
|---|---|---|
| 0 135 078 | 3/1985 | European Pat. Off. |
| 3721843 | 7/1987 | Germany . |
| 2 025 589 | 1/1980 | United Kingdom . |
| 2 025 590 | 1/1980 | United Kingdom . |
| 2 257 162 | 1/1993 | United Kingdom . |
| 2 257 239 | 1/1993 | United Kingdom . |

OTHER PUBLICATIONS

Patent Abstracts of Japan, JP4263026, Naoki et al., "Tin Separating Device Line for Tin Plating Steel Sheet", Feb. 2, 1993.

*Primary Examiner*—Melvyn Andrews
*Attorney, Agent, or Firm*—Young & Thompson

[57] ABSTRACT

A device for the pretreatment of electronic scrap, comprising a scroll cylinder (1) with a worm screw (2) inside it, endowed with inputs and outputs for thermal exchange fluid (13, 8) and electronic scrap to be treated (6, 14); a furnace comprising sucha device, further comprising input (9, 11) and output (23, 24) air barriers; a refrigerator comprising such a device too; as well as a proces for the pretreatment of electronic scrap making use of such a furnace and refrigerator.

4 Claims, 2 Drawing Sheets

DEVICE FOR THE PRETREATMENT OF ELECTRONIC SCRAP

FIELD OF THE INVENTION

The present invention relates to the field of the pretreatment of electronic scrap for recovering the constituent elements thereof, in particular the metal.

More specifically, the present invention relates to a device for the pretreatment of electronic scrap, suitable to allow the subsequent recovery of its components.

Moreover, the present invention relates to a furnace and to a cooler for the pretreatment of electronic scrap, implemented with such a device.

Moreover, it relates to a process for the pretreatment of electronic scrap, that avails itself of the use of such a device.

In the sense of the present disclosure, by "electronic scrap" electronic components, devices and circuits are meant coming from the scrapping of apparatuses that use them as their hardware, such as for instance computers, television, radio sets, telephone systems and so on.

In the sense of the present disclosure, by "pretreatment" a treatment is meant in consequence of which the constituent metal doesn't turn out to be already directly recovered from the electronic scrap, but is recovered substantially totally as electrolytic metal, by means of devices and processes being the subject matter of copending U.S. patent applications, in the name of the same Applicant hereof.

BACKGROUND OF THE INVENTION AND PRIOR ART

Electronic scrap, regardless of its origin (computers, television, radio sets, telephone systems, etcetera) has revealed itself, put into the dump, not a negligible danger for the environment in which we live, not to speak about the fact that in this way enormous quantities of metals, sooner or later no longer available, are irretrievably lost.

Therefore, already in the past the same Applicant hereof had suggested a device suitable treat electronic scrap so as to be able to recover the metal contained in it.

Such a device provided a cocurrent encounter of the electronic scrap with a flow of thermal exchange fluid.

In order to obtain the mutual separation of the constituent components of the scrap a high temperature heating was provided in a furnace made up of such device.

As a measure against possible leakages from its inside a single air barrier was provided during its operation.

However, the efficiency of such a device turns out to be low, in the sense that the quantity of metal not recoverable is considerable.

Moreover, the measures against the leakages from inside turn out to be unsure.

This constitutes a serious shortcoming, as in the interior of the device during its operation at high temperature extremely dangerous vapors form, though in a very small quantity, such as for instance possible dioxin, bromine vapors, mercury vapors, phenols, etcetera.

OBJECTS AND CHARACTERISTICS OF THE INVENTION

The object of the present invention is, therefore, to provide a device for the pretreatment of electronic scrap that turns out to be substantially more efficient that the precedently one suggested above.

Such an object is achieved with a device as set forth in the annexed independent claim 1.

Its feature consists in contacting the mass of electronic scrap with the thermal exchange fluid much more efficiently than in prior art devices. In particular it provides a mixing of the electronic scrap with the thermal exchange fluid for a longer time.

Another object of the present invention is to provide a device of the aforementioned type, which is moreover safe from leakages during its operation at high temperature.

Such an object is achieved with a furnace according to the annexed independent claim 4.

Its feature also consists in being able to bring the electronic scrap to such a temperature as to obtain the removal therefrom of the solder and to cause protection lakes and all what acts as a mantle and covering of the single components of the scrapped system to wrinkle, so as to leave the metal of each single component substantially bare. The whole is arranged so as not to cause atmospheric pollution owing to leakage from the device of the vapors that will inevitably form in it, as a result of the high heating (up to 230°–240° C.), as mentioned above extremely dangerous, though in very small quantities.

Another object of the present invention is to provide a process for the pretreatment of electronic scrap making use of the device according to the present invention.

Such an object is achieved with the process according to the annexed independent claim 18.

It avails itself of a heating in a furnace with the features of above, and of a subsequent cooling of the plastics and of the metals coming out of said furnace, realized by means of a refrigerator in turn comprising a device according to the present invention.

SUBJECTS OF THE INVENTION

Therefore, the present invention relates to a device for the pretreatment of electronic scrap, comprising
- a rotary cylinder with a worm screw fixed at its inner surface, and closed at its two ends, respectively of input and output, by two corresponding input and output heads;
- means for actuating in rotation said cylinder sequentially directions in both;
- means for inputting and means for removing respectively into and from said cylinder electronic scrap to be treated, and
- means for inputting and means for removing thermal exchange fluid respectively into and from said cylinder.

It is envisaged that the device for the pretreatment of electronic scrap according to the present invention has its worm screw of said cylinder interleaved in several points by walls arranged diametrically as a radiant crown with respect to the cylinder itself.

It is further envisaged that the device for the pretreatment of electronic scrap according to the present invention has lifting vanes interleaved in longitudinal sense betwwen the threads of the worm screw of said cylinder.

The present invention particularly also relates to a rotary furnace for the pretreatment of electronic scrap comprising a device as just mentioned, wherein
- said means for inputting electronic scrap into said cylinder comprise a charging tube with an end that opens in the cylinder through said input head, and with the opposite end at the outside constituting a mouth for charging electronic scrap;

said means for removing said thermal exchange fluid from said cylinder are made up of a suction opening through said input head;

said suction opening being provided in offtake from said charging tube;

means being provided between said suction opening and said charging mouth for temporally selectively admitting electronic scrap into the interior of the cylinder;

an air barrier being provided between said charging mouth and said means for temporally selectively admitting electronic scrap;

said means for removing electronic scrap from said cylinder being made up of an exhaust conveyor through said output head;

said means for inputting thermal exchange fluid into said scroll cylinder comprising a delivery manifold;

said exhaust manifold being endowed with an air barrier downstream of said delivery manifold.

It is particularly envisaged that said means for temporally selectively admitting electronic scrap into the cylinder comprise a hermetic slider closure.

Moreover, it is provided that between said means for inputting thermal exchange fluid into said cylinder and said air barrier provided on said exhaust conveyor a wing closure is provided.

It is further particularly provided that said air barrier provided between said charging mouth and said temporally selective means for admitting electronic scrap into the cylinder is made up of an air jet fed through a delivery opening converging to said charging tube to strike the entire cross section thereof and removed through a suction opening, coverging to said charging tube too.

It is further particularly provided that said air barrier wherewhich said exhaust conveyor is endowed is made up of an air jet fed through a delivery opening converging to the exhaust conveyor itself to strike the entire cross section thereof and removed through a suction opening, converging to the exhaust conveyor too.

It is envisaged that the rotary furnace for the pretreatment of electronic scrap according to the present invention comprises means for collecting the fluidized solder output from the cylinder.

It is particularly provided that said means for collecting the fluidized solder comprise a grid.

It is moreover envisaged that the rotary furnace for the pretreatment of electronic scrap according to the present invention further comprise a circuit for the recirculation of the thermal exchange fluid, comprising means for filtering and means for washing the thermal exchange fluid.

It is provided that a tank for storing thermal exchange fluid is inserted in said recirculation circuit.

It is particularly provided that said thermal exchange fluid is nitrogen.

It is further envisaged that the furnace for the pretreatment of electronic scrap according to the present invention comprise a burner for burning the air barrier and eventually burning the thermal exchange fluid.

Moreover, the present invention relates to a cooler for the pretreatment of electronic scrap comprising a device as set forth above, wherein said means for inputting electronic scrap into said cylinder comprise a charging tube through said input head;

said means for inputting thermal exchange fluid comprise a delivery opening through said output head, and said means for removing the thermal exchange fluid comprise a suction hood towards said output head.

It is envisaged that the cooler for the pretreatment of electronic scrap according to the present invention comprises a burner for the thermal exchange fluid itself.

It is particularly provided that said thermal exchange fluid is air.

Finally, the present invention relates to a process for the pretreatment of electronic scrap, comprising the stages of:

(I) heating of the electronic scrap in a rotary furnace;

(II) collection and enrouting of the solder at the output;

(III) Cooling of metals and plastics at the output in a cooler as set forth above, and (IIII) separation of the ferrous metals from nonferrous metals and plastics at the output.

BRIEF DISCLOSURE OF THE DRAWINGS

Figure 2:
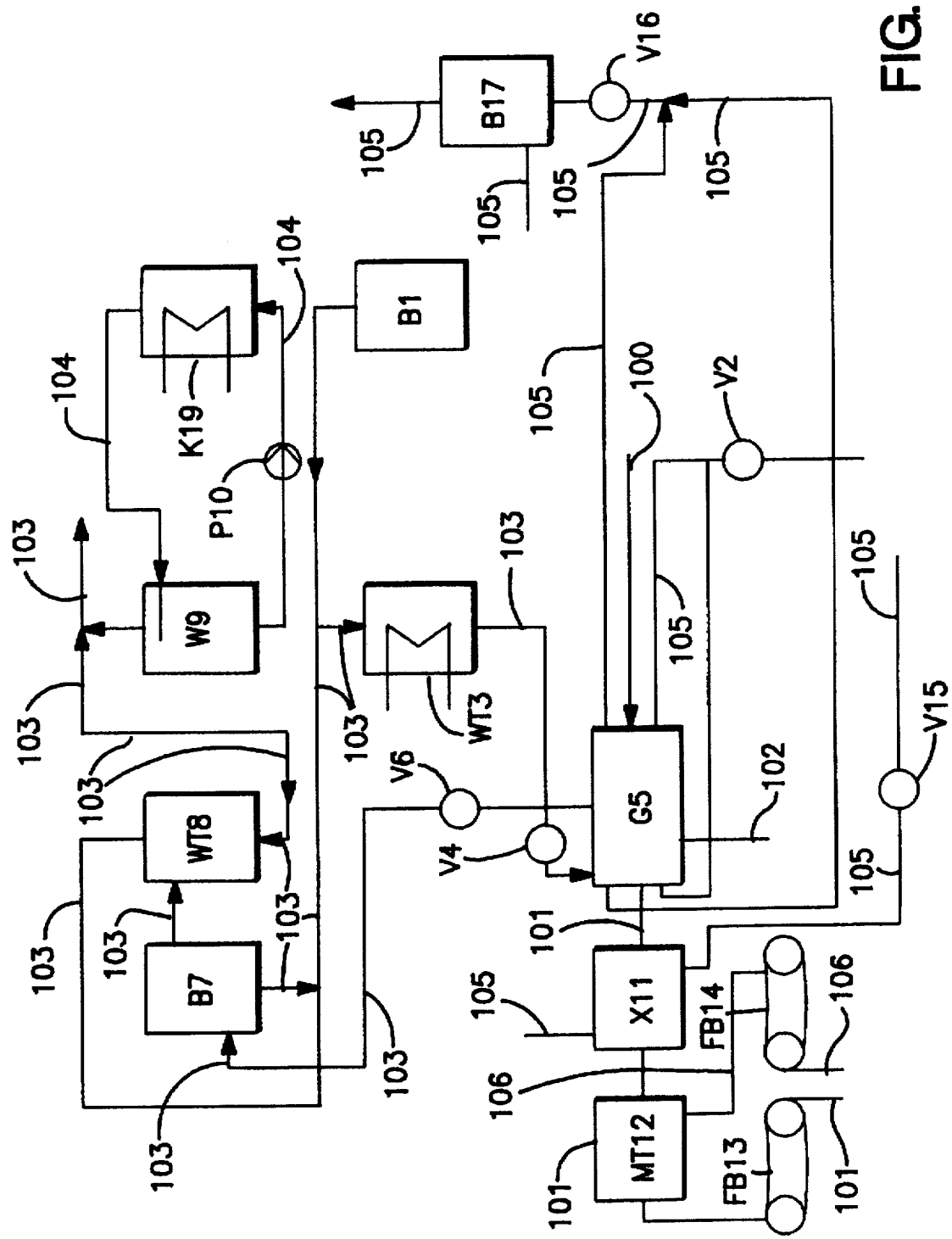

The present invention will be best understood based upon the following detailed dislosure of its preferred embodiment, given only as a matter of example, absolutely not of restriction, considered with reference to the annexed drawings, wherein:

FIG. 1 is a longitudinal section view of a device for the pretreatment of electronic scrap according to the present invention, and FIG. 2 is a block scheme representing the flow of the line for the pretreatment of the electronic scrap, making use of such a device.

DETAILED DISCLOSURE OF THE INVENTION

With reference to FIG. 1 it is now illustrated the construction of a device that realizes the teaching of the present invention.

A cylinder 1, able, actuated by an electric motor 20 through transmission members 21 and 22, to rotate on its axis, arranged at an inclination to its end part such as to render the discarhge easier of what is poured in it from the other side, of a length and a diameter suitable for its predetermined treatment throughput, bears, fixed on its inner surface, a worm screw spiral 2, of a suitable pitch and depth.

The worm screw 2 is interleaved in several points with walls 3 concering at least three fourths (¾) of the diameter of the scroll cylinder 1 and arranged diametrically as a radiant crown with respect thereto, so as to form an alternating route such as to constrain a mass to be heated input in it and a heating medium to mix for some time, so as to obtain an intimate heat exchange.

In the longitudinal sense, there are lifting vanes 4, these interleaved between the threads of the spiral 2 too, which, during the rotation of the cylinder 1, lift the mass input in it, which mass will fall again upon reaching the sliding point, to be thereafter relifted by subsequent vanes 4

The cylinder 1, also called the working cylinder hereafter for the function performed by it, is delimited by a side, constituting an input end, by an input head 5, which has at its center a hole of a suitable diameter, where a stationary charging tube 6 goes house itself. This is achieved by means of a suitable labyrinth seal 7 with gaskets by its outer side, towards the head 5, hermetically sealed on the head 5 itself, which is welded and rotates together with the working cylinder 1.

There are:

(I) an opening 8 for sucking the heat conducting medium or element or fluid coming from the inside of the working cylinder 1, so shaped as to suck this in a predetermined direction, served by an aspirator of suitable flowrate and power. Upstream of this an electric grid fliter is arranged of such a size and flowrate as to be able to keep all the dust, even the finest transported by the heat conducting element without needing too frequent cleanings. The heat conducting element empties into a heat exchanger having characteristics suitable to the object, wherefrom, once cooled, the heat conducting element goes to a washing system. This is of such a volume as to be able to receive and treat the not negligible quantity of heating conducting elements as well as carrier of vapors of bromine and compounds thereof, mercury vapors, phenols and probable dioxins; a cooling machine being appointed to maintain the temperature of the liquid of the washing system at a temperature of a preset value. The heat conducting element after the washing passes into the heat exchanger, where it reabsorbs a considerable part of the heat here precedently given, whereafter it goes to the heat exchanger of the heater to flow thereafter, now at a temperature suitable to perform its functions, through an appointed compressor, into the working cylinder 1. The taking place of any anomaly has the consequence of the immediate interrption of the inflow of heat conducting element into the device, as well as the immediate complete refill of the conducting element already in circulation with fresh heat conducting element coming from a tank for storing the same. This also happens when the system for whatever reason stops itself or is stopped. The dirty conductor element sucked by the system is directly enrouted to the burner for the barrier air in the heat generator, where it is burned, then cleaned, and II) an opening for delivering air 9, so made as to direct the air under high pressure onto the entire cross section of the stationary charging tube 6 towards its mouth piece 6', so as to form a proper air barrier, the air coming from a suitable fan, ending to the stationary charging tube 6.

Between the opening for sucking the heat conducting element 8 and the opening for delivering the barrier air 9 there is a hermetic slider closure 10. This opens itself to allow the periodic charging of the mass of electronic scrap to be heated and remains open for the periodic charging time.

An opening for sucking the air 11 is arranged at the outer end of the stationary charging tube 6, so as to suck the barrier air and eventual parts of conducting elements coming from the hermetic slider closure during the periodic opening times of the same (charging times), and air from the immediate neighborhood of the cylinder or charging opening 6. The aspirator appointed for this function conveys all the mass of air sucked in the combustion chamber of a heat generator (not represented), where by means of a suitable burner it is burned, to avoid potential pollution.

The working cylinder 1 on the exhaust side or output end has a stationary head 12, which is hermetically sealed too, but movable, on the same. This head 12 is constructed in such a manner as I') to form in its upper part a delivery manifold 13 for the heat conducting or heating element or fluid, and to form in its lower part, much below the working cylinder 1, an exhaust conveyor or opening where, as for the stationary charging tube:

II') a barrier air delivery opening 23, arranged and operating identically with the one 9 arranged on the charging side, and a barrier air suction opening 24, which will suck parts of heat conducting element, potentially polluted, and air in the immediate neighbourhood of the exhaust, the whole identically with the charging side. This air too will be sent, through a suitable fan, to be burned as well as the suction air by the charging side end.

Between the opening for delivering the heat conducting element 13 and the opening for delivering the barrier air 24 a barrier wing 15 is arranged, this to the end of a greater safety against an eventual leakage of the heat conducting element, now loaded with harmful vapors, to the exterior. This is rendered substantially impossible by the air barrier, because the system for controlling and regulating the barometric pressures in the whole device is such that the pressure and the quantity of the barrier air are such, with respect to the pressure existing at the interior of the working cylinder 1, as to eventually allow part of the air to pour itself into this but not to allow the leakage of the heating element.

The exhaust conveyor 14 bears in its lower portion a grid 16 fit for collecting almost fluid solder.

The disclosed device is suitable to be used as a furnace.

Premising that in the device for the hot pretreatment of electronic scrap the danger must be avoided in the most rigorous form of eventual self-ignition or explosions, nitrogen is used as the heat conducting element and vector of the gases developed from the scrap as a consequence of the heating whereto this is subjected.

The apparatuses and the conduits of connection among them make up a hermetic system. The only points where leakages could happen from the circuit or inlets into it are the stationary charging tube and the exhaust conveyor of the device. Even when leakages would happen in these points, the contrivances provided herein render these leakages absolutely harmless.

Therefore, the disclosed device achieves the objects of the present invention.

A cooler is now disclosed comprising a device according to the teaching of the present invention (for which the arrangement is provided, downstream of the exhaust conveyor 14 of the just disclosed furnace).

The cooling cylinder 1' is identical with precedent one 1, and it is arranged at an inclination to its end part too, so as to render the discharge of what is poured in it easier, coming from the exhaust opening of the working cylinder 1. Its upstream end is integral with a head 5' whereinto the conveyor 14 mentioned above empties and an opening 25 for delivering the cooling air, this one provided by a suitable compressor in the right quantity and at the right pressure. The upper part of the end downstream of said cooling cylinder 1' is provided with a hood for sucking the cooling air (not represented), which will become, once here brought away by a suitable aspirator, burning air of the heat generator. In this way it is avoided that residues of harmful vapors still present in the mass in the cooling, though in very small quantities, can be sources of atmospheric pollution.

It is understood that the heat generator will be endowed with a combustion chamber and fuel burners, one for the heating combustion and one as a burner of the air supposed to be polluted, at high temperature, and that all the parts of the system at high temperatures are suitably thermally insulated.

Having disclosed the constitution and the operation of devices for the pretreatment of electronic scrap according to the teaching of the present invention, the process is now disclosed for the pretreatment of electronic scrap according to the present invention.

The subject process comprises the stages of:

(I) heating of the electronic scrap in a rotary furnace as disclosed above;

(II) collection and enrouting of the solder at the output;

(III) cooling of the metals and plastics at the output in a cooler as disclosed above, and (IIII) separation of the ferrous metals from nonferrous metals and from the plastics at the output.

FIG. 2 illustrates a line for the realization of such a process.

In a rotary furnace G5 as set forth above electronic scrap 100, nitrogen 103 and air 105 are input and removed at the output. The latter comes from a fan V2 and is removed by an aspirator V16, to be fed to a burner B17, wherefrom it is made to recirculate by means of the aforesaid fan V2.

At the output of the rotary furnace G5 there is fluidized solder 102 coming from the electronic scrap.

The nitrogen 103 at the output of the furnace G5 is drawn through an aspirator V6, and brought to an electric grid filter B7 wherefrom it passes to a heat exchanger WT8 and therefrom to a washing apparatus W9; the washing fluid is water 104, that is drawn at the output from it through a pump P19, fed to a cooling machine K19 and therefrom refed to the washing apparatus W9. From this nitrogen 103 exits for which there are provided a removal branch and a return branch to the heat exchanger WT8, wherefrom it passes to a heat exchanger WT3 and herefrom it returns to the furnace G5 through a suitable compressor V4. The nitrogen comes from a storing tank B1 inserted immediately upstream of the heat exchanger WT3.

At the output of the furnace G5 the metals and the plastics 101 are input in a cooler K11 as precedently set forth, whereto air 105 is fed and removed that is burned in the burner 105. The metals and the plastics 101 at the output are input into a magnetic drum MT12 whereafter a conveyor belt FB13 follows that moves the nonferrous metals and the plastics 101; under the magnetic drum there is another conveyor belt FB14 to move the parts in iron 106.

The line is used first of all substituting the present air with nitrogen, this one coming from the tank B1 above, where it is kept at the liquid state. The nitrogen will pour into in the whole of the apparatuses and conduits from a connection arranged before the exchanger WT3 from the heat generator.

Once sure that the nitrogen has substituted itself to all the air in the system, one provides for bringing the nitrogen itself to the operating temperature is. Once the preset temperature reached, one provides for starting the mechanism for inputting the scrap into the device, then one after another all the components of the system are started in the order of succession. It is understood that all this will take place automatically. A system for measuring the pressure of the heating element, arranged between the compressor V4 and the opening for delivering the heating element 13, will provide, by controlling a suitable solenoid valve, for feeding further nitrogen when the nitrogen is no longer sufficient in the system.

The present invention has been disclosed and illustrated with reference to specific embodiments thereof, but it is to be expressedly understood that variations, additions and/or omissions can be made, without so departing from the relevant protection scope, defined by the appended claims.

I claim:

1. A device for the pretreatment of electronic scrap, which comprises a cooling cylinder (1') and a working cylinder (1), said working cylinder having a worm screw (2) fixed on an inner surface, and input and output ends;

means (20, 21, 22) for rotating said working cylinder (1) selectively in opposite directions;

means for inputting (6, 6') and means for removing (14) respectively into and from said working cylinder (1) electronic scrap to be treated, and means for inputting (13; 25) and means for removing (8) inert gas as thermal exchange fluid respectively into and from said working cylinder (1).

2. The device for the pretreatment of electronic scrap according to claim 1, further characterized in that the worm screw (2) of said working cylinder (1) is provided at several points by walls (3) arranged diametrically as a radial crown with respect to the cylinder;

said means for inputting electronic scrap into said cylinder comprises a charging tube (6) with an end that opens into said working cylinder (1), and with an opposite end at the outside constituting an inlet for charging electronic scrap (6');

said means for removing said thermal exchange fluid from said working cylinder (1) are made up of an opening (8) through said charging tube (6);

means (10) on said charging tube (6) for temporally selectively admitting electronic scrap into an interior of said working cylinder (1);

means providing an air barrier (9; 11) between said charging inlet (6') and said means (10) for temporally selectively admitting electronic scrap;

said means for removing pretreated electronic scrap from said working cylinder (1) being made up of an exhaust conveyor (14) from said cylinder (1);

said means for inputting thermal exchange fluid into said cylinder (1) comprising a delivery manifold (13);

said means for removing electronic scrap (14) having an air barrier (23, 24) downstream of said delivery manifold (13).

3. The rotary furnace for the pretreatment of electronic scrap according to claim 1, wherein said means for inputting electronic scrap into said working cylinder comprises a hermetic closure (10).

4. The rotary furnace for the pretreatment of electronic scrap according to claim 2, wherein said air barrier is made up of an air jet fed through a delivery opening (23) into said means for removing scrap (14) and removed through a suction opening (24) opening into said means for removing scrap.

* * * * *